US012767865B2

(12) United States Patent
Dunky et al.

(10) Patent No.: US 12,767,865 B2
(45) **Date of Patent: *Oct. 20, 2026**

(54) MODIFIED AMINOPLASTIC ADHESIVE RESIN, PROCEDURE OF ITS PREPARATION, AND COMPOSITE MATERIALS PREPARED USING THE MODIFIED AMINOPLASTIC ADHESIVE RESIN

(71) Applicant: Lignum Technologies AG, Niederteufen (CH)

(72) Inventors: Manfred Dunky, St. Pölten (AU); Luis Miguel Olaechea, Fribourg (CH); Ingo Mayer, Pieterlen (CH); Reto Frei, Evilard (CH)

(73) Assignee: LIGNUM TECHNOLOGIES AG, Niederteufen (CH)

( * ) Notice: Subject to any disclaimer, the term of this patent is extended or adjusted under 35 U.S.C. 154(b) by 213 days.

This patent is subject to a terminal disclaimer.

(21) Appl. No.: 18/289,814

(22) PCT Filed: May 26, 2021

(86) PCT No.: PCT/EP2021/064092

§ 371 (c)(1),
(2) Date: Nov. 7, 2023

(87) PCT Pub. No.: WO2022/248039

PCT Pub. Date: Dec. 1, 2022

(65) Prior Publication Data

US 2024/0247173 A1 Jul. 25, 2024

(51) Int. Cl.

*C09J 161/24* (2006.01)
*B29C 35/02* (2006.01)

(Continued)

(52) U.S. Cl.

CPC ............ *C09J 161/24* (2013.01); *B29C 35/02* (2013.01); *B29C 65/4835* (2013.01);

(Continued)

(58) Field of Classification Search

None

See application file for complete search history.

(56) References Cited

U.S. PATENT DOCUMENTS 4,692,478 A 9/1987 Viswanathan et al.
5,176,028 A 1/1993 Humphrey (Continued)

FOREIGN PATENT DOCUMENTS

EP 0291593 A1 11/1988
EP 3366468 A1 8/2018

(Continued)

OTHER PUBLICATIONS

International Search Report and Written Opinion in International Patent Application No. PCT/EP2021/064902 dated Mar. 10, 2022, 8 pages.

(Continued)

*Primary Examiner* — Randy P Gulakowski
*Assistant Examiner* — Audra J Destefano
(74) *Attorney, Agent, or Firm* — Crowell & Moring LLP

(57) ABSTRACT

A temperature-curable aminoplastic adhesive resin that is a (poly)-condensate of: (i) at least one aminoplast-forming chemical; (ii) 5-hydroxymethylfurfural (5-HMF), its oligomers and/or its isomers; and, (iii) at the least one second (poly-)condensable chemical. Composite boards, such as wood-based panels, can be produced using this adhesive resin. The production of the aminoplastic adhesive resin includes the reaction of urea with 5-hydroxymethylfurfural (5-HMF) and glyoxal. The adhesive resin can be used in the production of wood-based panels such as particleboards, (Continued)

fiberboards and products usually called, among others, plywood and/or blockboards.

14 Claims, 1 Drawing Sheet

(51) Int. Cl.

| | |
|---|---|
| ***B29C 65/48*** | (2006.01) |
| ***B29K 61/00*** | (2006.01) |
| ***C08G 12/12*** | (2006.01) |
| ***C08G 12/42*** | (2006.01) |
| ***C09J 5/06*** | (2006.01) |
| ***C09J 161/30*** | (2006.01) |

(52) U.S. Cl.
CPC ........... *C08G 12/12* (2013.01); *C08G 12/422* (2013.01); *C09J 5/06* (2013.01); *C09J 161/30* (2013.01); *B29K 2061/00* (2013.01); *C08G 2170/20* (2013.01)

(56) References Cited

U.S. PATENT DOCUMENTS

2018/0244824 A1* 8/2018 Mortato ................. B27N 3/002
2018/0244825 A1* 8/2018 Badoux .................. C09J 161/06

FOREIGN PATENT DOCUMENTS

| | | | |
|---|---|---|---|
| EP | 3366712 | A1 | 8/2018 |
| EP | 3366714 | A1 | 8/2018 |
| EP | 3366713 | B1 | 4/2020 |

OTHER PUBLICATIONS

Xi et al., "5-Hydroxymethyl fufural modified melamie glyoxal resin," *Journal of Adhesion*, 96(13): 1167-1185 (2020).
Esmaeili et al., "Hydroxymethyl furfural-modified urea—formaldehyde resin: synthesis and properties," *European Journal of Wood and Wood Products*, 75(1): 71-80 (2016).
Foreign-language Office Action issued in Ukraine Application No. a 2023 05897 dated Apr. 14, 2026, with English translation (14 pages).

* cited by examiner

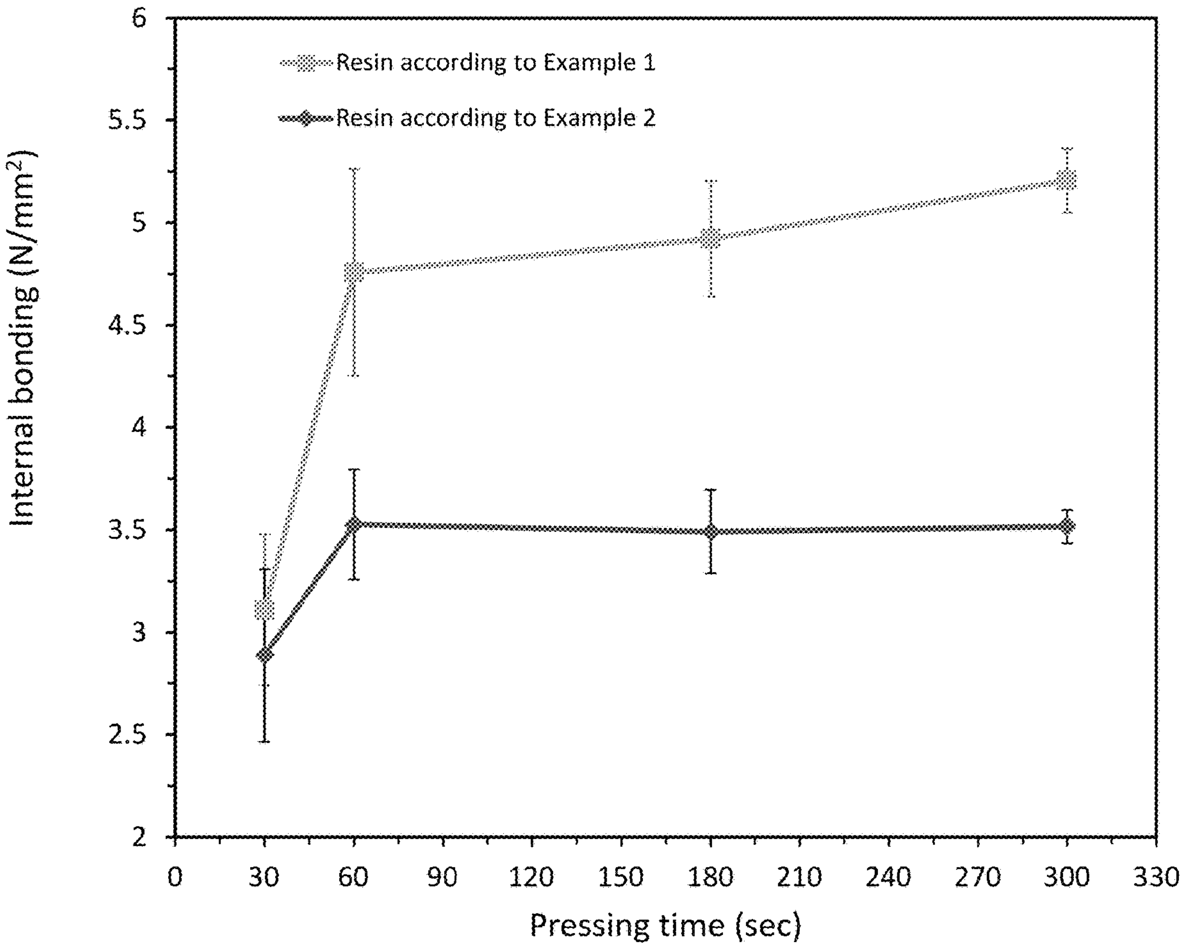
Resin according to Example 1
Resin according to Example 2
Internal bonding (N/mm2)
6
5.5
5
4.5
4
3.5
3
2.5
2
0
30
60
90
120
150
180
210
240
270
300
330
Pressing time (sec)

MODIFIED AMINOPLASTIC ADHESIVE RESIN, PROCEDURE OF ITS PREPARATION, AND COMPOSITE MATERIALS PREPARED USING THE MODIFIED AMINOPLASTIC ADHESIVE RESIN

RELATED APPLICATIONS

This application is a 371 nationalization of international patent application PCT/EP2021/064092, filed on May 26, 2021, the entirety of which is hereby incorporated by reference.

BACKGROUND

This disclosure is related to a temperature-curable aminoplastic adhesive resin that is a (poly)-condensate of: (i) at least one aminoplast-forming chemical; (ii) 5-hydroxymethylfurfural (5-HMF), its oligomers and/or its isomers; and, (iii) at the least one second (poly-)condensable chemical.

Composite boards, such as wood-based panels, just to mention one of many types of composite boards, can be produced using this adhesive resin. In one aspect, the production of the said aminoplastic adhesive resins includes the reaction of urea with 5-hydroxymethylfurfural (5-HMF) and glyoxal. In a further aspect, said adhesive resin can be used in the production of wood-based panels, such as, but not restricted to: particleboards, fiberboards, and products usually called, among others, plywood and/or blockboards.

STATE OF THE ART

The reactions between aminoplast-forming chemicals, with urea and melamine as most important but not exclusive examples, with various types of aldehydes (e.g., formaldehyde as the most important representative), are well known and have been described in chemical literature in a non-manageable number of papers and textbooks, such as by: Dunky (Urea-formaldehyde (UF-) glue resins. Int. J. Adhesion Adhesives 18 (1998) 95-107; Adhesives in the Wood Industry. In: A. Pizzi, K. L. Mittal (Eds.): Handbook of Adhesive Technology, 2$^{nd}$ Ed., Marcel Dekker Inc., 2003, pp. 887-956; Adhesives in the Wood Industry. In: A. Pizzi, K. L. Mittal (Eds.): Handbook of Adhesive Technology, 3$^{rd}$ Ed., 2018, pp. 511-574; Wood Adhesives and Additives. In: Springer Handbook of Wood Science and Technology, A. Teischinger and P. Niemz (Eds.), 2021 (in press); Wood Adhesives Based on Natural Resources: A Critical Review Part IV. Special Topics. Reviews of Adhesion and Adhesives, 2021 (in press), Dunky and Niemz (Wood-Based Panels and Adhesive Resins: Technology and Influential Parameters (German). Springer, Heidelberg, 2002, pp. 986), and Dunky and Pizzi (Wood Adhesives. In: D. A. Dillard, A. V. Pocius (Eds.): Adhesion Science and Engineering, Volume 2: Issue Surfaces, Chemistry and Applications. Elsevier Science B.V., Amsterdam, The Netherlands. 2003, pp. 1039-1103). Such aminoplastic adhesive resins based on urea and/or melamine, in combination with formaldehyde, are the by far dominating adhesives used in the wood-based panels industry.

Though the former problem of high subsequent formaldehyde emission from such wood-based panels has been eliminated to a large extent, nevertheless, the classification of formaldehyde as cancerogenic substance, on the one hand, and the strong wishes to eliminate synthetic chemicals and replace them by naturally-derived substances, has triggered replacement of formaldehyde in adhesives as they are used for composite boards. Various aldehydes to replace formaldehyde in such resins have been described in literature, such as, among others: Dunky (Wood Adhesives and Additives. In: Springer Handbook of Wood Science and Technology, A. Teischinger and P. Niemz (Eds.), 2021 (in press); Wood Adhesives Based on Natural Resources: A Critical Review Part IV. Special Topics. Reviews of Adhesion and Adhesives, 2021 (in press)) has given an overview on such initiatives.

Among other aldehydes, 5-hydroxymethylfurfural (5-HMF) and glyoxal have been the focus of researchers.

5-HMF can react with urea and melamine. Urea-5-HMF-formaldehyde (UHF) resins with partial replacement of formaldehyde by 5-HMF were prepared by an alkaline-acid method. The formaldehyde emission from particleboards (PB) bonded by UHF was significantly lower compared to urea-formaldehyde (UF) resin, The UHF-bonded boards also showed better mechanical properties compared to boards with UF resins, as well as lower water absorption and thickness swelling (Esmaeili, N., M. J. Zohuriaan-Mehr, S. Mohajeri, K. Kabiri and H. Bouhendi, Hydroxymethyl furfural-modified urea-formaldehyde resin: Synthesis and properties. Eur. J. Wood Prod. 75, 71-80 (2017)).

Ghodoussi (Structural determination of a new carbohydrate-phenolic based resin coupled with urea. PhD thesis, Oregon State University, Corvallis, OR, USA (1992)) described in his PHD thesis the reaction of urea with the aldehyde groups of two 5-HMF molecules, yielding hydroxymethylene bridges and finally imine structures after removal of water.

EP 291 593 A1 (Viswanathan and Westermann, 1987) and U.S. Pat. No. 4,692,478 (Viswanathan and Westermann, 1986) describe that a carbohydrate was chemically decomposed under acidic conditions to polymerizable reactants. Then reaction took place with ammonia to form a resin. It is mentioned that the carbohydrate is converted to polymerizable reactants such as 5-HMF and dimers and oligomers of HMF and related compounds, which chemical moieties then react further with ammonia, as this is a similar type of reaction as between urea and an aldehyde.

A series of patents and patent applications to AVA BIOCHEM AG (former AVALON Industries AG) describe the formation of aminoplastic resins based on urea and 5-HMF (EP 3 366 712 A1, EP 3 366 713 B1, EP 3 366 714 A1, and EP 3 366 468 A1). EP 3 366 712 A1 claims, among others, the formation of HMF oligomers by C—C bonding, with one of the two C belonging to the aromatic furan ring as main feature of the used 5-HMF when producing 5-HMF-based aminoplastic resins. In a similar way, EP 3 366 713 B1 claims the preparation of resins and wood composites, characterized in that the 5-HMF contains a HMF oligomer and reacts among others with aminoplast forming agents, such as urea or melamine. The given example in EP 3 366 713 (Example 1, identical with Example 2 in EP 3 366 712) describes the preparation of the special 5-HMF-oligomers, the resin preparation, the board preparation, and the board testing. Finally in this series, EP 3 366 468 A1 describes the same type of 5-HMF-based resins and includes the same example as given already in EP 3 366 713 B1, with preparation of the oligomers, resin preparation, board preparation, and testing.

Urea-glyoxal resins with glyoxal replacing formaldehyde are reported in the chemical literature, such as by: Deng et al. (Deng, S. D., Li, X. H., Xie, X. G., and Du, G. B. (2013). Reaction mechanism, synthesis and characterization of urea-glyoxal (UG) resin. Chinese Journal of Structural Chemistry, 32(12), 1773-1786; Deng, S. D., G. Du, X. Li, and Pizzi, A. (2014). Performance and reaction mechanism of zero formaldehyde-emission urea-glyoxal (UG) resin. Journal of the Taiwan Institute of Chemical Engineers, 45(4), 2029-2038; Deng, S., Du, G., Li, X., and Xie, X. (2014). Performance, reaction mechanism, and characterization of glyoxal-monomethylol urea (G-MMU) resin. Industrial & Engineering Che-mistry Research, 53(13), 5421-5431; Deng S., Pizzi A., Du G., Lagel M. C., Delmotte L., Abdalla S. (2018). Synthesis, structure characterization and application of melamine-glyoxal adhesive resins, Eur. J. Wood Prod., 76, 283-296) or Younesi-Kordkheili and Pizzi (Younesi-Kordkheili, H. and Pizzi, A. (2018). A comparison between the influence of nanoclay and isocyanate on urea-glyoxal resins. Int. Wood Prod. J. 9, 9-14).

Urea-glyoxal resins (also still comprising formaldehyde) have been known for more than half a century, however not as a wood adhesive, but preferably for the textile finishing market for use as wrinkle-recovery, wash-and-wear, and durable press agents (NPCS Board of Consultants & Engineers, The Complete Book on Adhesives, Glues & Resins Technology (with Process & Formulations), second edition, Asia Pacific Business Press Inc., New Delhi, India (2016)).

Resins based on the reaction of urea with 5-HMF and glyoxal in the same procedure have not yet been mentioned in the literature. Glyoxal as a nonvolatile and non-toxic aldehyde was used as a substitution of formaldehyde to prepare melamine-glyoxal (MG) resins, as reported by Xi et al. (Xi, X., Liao, J., Pizzi, A., Gerardin, C., Amirou, S., & Delmotte, L. (2019). 5-Hydroxymethyl furfural modified melamine glyoxal resin. The Journal of Adhesion, 1-19). These resins suffered from the lower reactivity of the glyoxal compared with formaldehyde. 5-HMF was therefore used as a modifier to improve the performance of melamine-glyoxal resins by preparing a 5-HMF-modified melamine-glyoxal resin, tested as plywood adhesive resin. The lower reactivity of the glyoxal compared with formaldehyde was improved by addition of 5-HMF. The proportion of 5-HMF in this resin was only small, according a molar ratio of melamine: glyoxal:5-HMF=1:6:0.3. Based on mass, the proportion of 5-HMF is only 10% based on the sum of aldehydes.

Preparing and testing various resins based on urea and 5-HMF as wood adhesives known from the above discussed prior art showed main bottlenecks and shortcomings. The resins showed severe problems during manufacturing when prepared according to recipes as described in patent literature such as EP 3 366 713 or EP 3 366 468. During the condensation phase, precipitations of molecules formed by reaction of urea and 5-HMF occurred, which caused inhomogeneous behaviour of the resin and strong deposits and coatings at the wall of the reactor and on the cooling and heating columns. This hinders a correct chemical procedure in the resin production and causes high and not manageable and acceptable effort for cleaning after each production batch, causing high amounts of waste water spoiled with chemicals, such as acids or alkaline substances, high costs for necessary and finally lost material, as well as for waste water treatment, as well as loss in reactor capacity and production volume.

Another shortcoming observed for resins based on aminoplast forming substances and aldehydes, as described in the chemical and patent literature, is the low storage stability, which causes, on the one hand, strong increase in the viscosity of the resin at unchanged solid mass content. This means that the resin is not stable during industrially necessary storage times, as usually given and necessary (a) for production and provision of the resin at the resin manufacturer, (b) the transport time for the resin from the resin manufacturer to the composite material producer, and (c) the necessary storage of the resin at the composite material producer. An excessive viscosity can cause problems in pumping of the resin, which is a usual procedure at the resin manufacturer and at the composite material producer, as well as problems in the usage of the resin during the production of the composite material, when it comes to uneven distribution of the resin during the step, where the lignocellulosic or non-lignocellulosic raw materials are mixed with the resin. A proper and even distribution of the resin on the lignocellulosic or non-lignocellulosic raw materials is essential to achieve sufficient properties and performance of the composite materials produced, and to run the production process of the composite material in cost efficient mode.

Other shortcomings of these resins are that the resins were not stable in themselves, causing further precipitations, as they had been partly already experienced during the resin production as such, and causing so-called phase separation, where part of the liquid resin settles to the lower part of the total volume of the resin, still remaining liquid, but with very high (honey-like) viscosity and in case even different chemical composition. This again causes strong problems or even renders impossible to pump this high viscous phase, as pumping is a usual procedure everywhere in the composite material production. Additionally such high viscosities, if this part of the resin could be still pumped, affect negatively the distribution of the resin on the lignocellulosic or non-lignocellulosic raw materials, causing uneven distribution and reduced properties and performance of the produced composite materials. On the other hand, also the upper and very low viscous portion of the resin affects negatively the production process of the composite material, causing effects as they are usually described as so-called over-penetration of the resin into the raw material, causing loss of bonding active substance, and hence the need for higher use of material, yielding additional production problems and higher costs. These effects of insufficient distribution of the resin and over-penetration of the resin are known well to skilled artisans of production of composite material and described extensively in literature, with Dunky (Dunky, M. (2018). Adhesives in the Wood Industry. In: A. Pizzi, K. L. Mittal (Eds.): Handbook of Adhesive Technology, 3rd Ed., 2018, pp. 511-574; Dunky, M. (2021). Wood Adhesives and Additives. In: Springer Handbook of Wood Science and Technology, A. Teischinger and P. Niemz (Eds.), 2021 (in press)) as just as two examples.

Therefore, an object of the present disclosure is the improvement of temperature-curable resins based on 5-HMF, but where these necessary improvements then are valid for all types of resins based on aminoplastic resin forming chemical species, means (i) moieties bearing $NH_2$— or NH— groups which (ii) are able to react with any type of aldehyde groups R—C(═O)H in the well known reaction path. A further technical objective of the present disclosure is to provide composite material in which the temperature-curable resin is used as binder, such as but not restricted to wood based materials, especially OSB panels, chipboards, HDF- or MDF-panels or plywood.

BRIEF DESCRIPTION OF THE DRAWING

FIG. 1 illustrates the development of the bond strengths with the press time for two resins described herein.

DETAILED DESCRIPTION

The present disclosure discloses a temperature-curable resin preparable by the (poly)-condensation of at least one aminoplast-forming chemical, with 5-hydroxymethylfurfural (5-HMF), its oligomers and/or its isomers, and at the least one second (poly-)condensable chemical, under reaction conditions under which said at least one aminoplast-forming chemical, 5-hydroxymethylfurfural (5-HMF), its oligomers and/or its isomers, and the at least one second (poly-)condensable chemical (poly-)condensate to the temperature-curable resin.

According to the present disclosure, 5-hydroxymethylfurfural, its oligomers and/or its isomers, are capable to react with the at least one aminoplast-forming chemical via polycondensation. Furthermore, the at the least one second (poly-)condensable chemical is capable to react with the at least one aminoplast-forming chemical and/or 5-hydroxymethylfurfural (5-HMF), its oligomers and/or its isomers via polycondensation.

The temperature-curable resin according to the present disclosure accordingly is a polycondensate. Preferably the aminoplast forming chemical comprises $NH_2$ or NH groups and the at least one second (poly-)condensable chemical comprises one or more aldehyde functions.

It has now been experienced by coincidence, and not yet reported in literature, that the (poly-)condensation of at least one aminoplast-forming chemical, 5-hydroxymethylfurfural (5-HMF), its oligomers and/or its isomers, and at the least one second (poly-)condensable chemical, can overcome the short-comings as they are described above in details.

Especially, it turned out in experiments, that precipitation and phase separation can be avoided, rendering the process suitable for industrial application of resin production.

Analysis of this practical experiences point to the fact, that the increase in hydro-philic behavior in the resin keeps the bigger molecules, as they are formed with the polycondensation reaction during the resin production, still in solution, hence avoiding the effects of precipitation and phase separation.

According to a specific embodiment, the at least one second (poly-)condensable chemical is at least one aldehyde different from 5-hydroxymethylfurfural, its oligomers or its isomers.

Preferably, the at least one second (poly-)condensable chemical is glyoxal.

Furthermore, the at least one aminoplast-forming chemical can be selected from the group of consisting of urea, melamine, substituted melamine, substituted urea, acetylenediurea, guanidine, thiourea, thiourea derivatives, diaminoalkane, or diamidoalkane or mixtures thereof.

According to an advantageous embodiment, the (poly)-condensation a molar ratio (a:b:c) of (a) the totality of the at least one aminoplast-forming chemical, to (b) the totality of 5-hydroxymethylfurfural (5-HMF), its oligomers and/or its isomers, to (c) the totality of the least one second (poly-) condensable chemical, is adapted to 1:0.1 to 1.0:0.05 to 0.5, preferably 1:0.2 to 0.4:0.1 to 0.3, particularly preferably 1:0.3 to 0.4:0.15 to 0.25.

The temperature-curable resin according to the present disclosure may have a solid content of 60-85 mass %, preferably 65-80 mass %. All solid contents were determined by evaporating the water content of the reaction solution after its preparation under vacuum until a constant mass has been achieved.

According to an additional advantageous aspect, the temperature-curable resin has a viscosity of 150-1,000 mPa*s, preferably 200-600 mPa*s, particularly preferably 200-400 mPa*s. The viscosity here is measured directly at the given liquid resin without any modification, only the temperature of the liquid resin is adjusted to 20° C. The measurement is done in the usual way as known to skilled artisans by a rotational viscosimeter (such as Brookfield viscosimeter), also described in EN ISO 3219:1994 Annex B.

According to the another aspect, the present disclosure relates to a method for the production of a temperature-curable resin by (poly)-condensation of at least one aminoplast-forming chemical with 5-hydroxymethylfurfural (5-HMF), its oligomers and/or its isomers, and at the least one second (poly-)condensable chemical, under reaction conditions under which said at least one aminoplast-forming chemical, 5-hydroxymethylfurfural (5-HMF), its oligomers and/or its isomers, and the at least one second (poly-)condensable chemical (poly-)condensate to the temperature-curable resin.

A specific embodiment of the method foresees that the (poly-)condensation is performed at temperatures in the range from 10 to 90° C., preferably in the range from 20 to 60° C., particularly preferably in the range from 20 to 50° C.

The (poly-)condensation can be carried out in a solution until the solution has reached a predetermined viscosity or the reaction is complete.

Another aspect of the present disclosure relates to a method for the production of composite materials, comprising the following steps:

provision of a temperature-curable resin according to the present disclosure, bringing into contact the temperature-curable resin with lignocellulose containing or non-lignocellulose containing material, or a mixture thereof, preparation of a curable mass, and curing of the curable mass under formation of the composite material, said curing being carried out by means of elevated temperature and pressure.

In a specific embodiment of this method, the lignocellulose-containing materials or the non-lignocellulose containing materials is selected from the group consisting of wood chips, wood fibers, plant fibers, wood flakes, wood strands, wood particles, wood stripes, mixtures of various lignocellulosic materials, inorganic fibres, inorganic fibre mats, and mixtures of these.

Moreover, the lignocellulose-containing or the non-lignocelluose containing material is mixed with an amount of 2% by weight to 20% by weight, preferably with an amount of 5% by weight to 15% by weight, of the temperature-curable resin, based on the weight of the dry lignocellulose-containing or non-lignocellulose containing material.

The step of preparing of a curable mass can be carried out in a flat press, continuous press, or molding press.

Advantageously, the curing of the resin is carried out in a press at temperatures of 160 to 250° C.

Finally, the present disclosure relates to a composite material, obtained by a method according to the present disclosure, as described in the foregoing, preferably composite boards based on wood or inorganic materials, especially in form of wooden particleboards, fiberboards, OSB panels, HDF- or MDF panels, plywood, and/or blockboards, which can be used among other applications as e.g. flooring-, wall-, or ceiling panels.

The present disclosure will be described in greater detail in the following, without limiting the disclosure to the specific details given.

That is, the preparation of the composite materials preferably follows the usual and well-known procedures, as they are described in literature, such as in the case of wood-based panels, by Dunky and Niemz (Dunky, M. and Niemz, P.

(2002). Wood-Based Panels and Adhesive Resins: Technology and Influential Parameters (German). Springer, Heidelberg, pp. 986). The procedure of the production of composite materials includes: (i) the preparation and provision of the cellulosic or inorganic materials, such as particles, strands, or fibers, to give only few examples of many examples suitable within the procedure of the production of composite materials; (ii) the preparation and provision of the suitable and necessary adhesive and adhesive mix, including not only the adhesive, but also other components, such as hardeners or crosslinkers; (iii) the provision of other additives or components, such as paraffin, in various form as hydrophobic agent; (iv) mixing according the well-known technologies of the various components, as mentioned under (i) to (iii); (v) preparation of a mass with certain structures and sizes under various sequences of one or several layers; (vi) pressing of this mass under impact of temperature and various pressures for a certain time, whereby the temperature can vary in a broad range, and where the pressures are selected accordingly in order to achieve the formation of the intended composite materials; and finally, (vii) cooling of the composite materials. The relevant conditions and details in the various steps (i) to (vi) depend on many parameters, such as the types of the wooden or inorganic raw materials, the types of a chemical components added, and the types, size, and shape of the composite materials as they shall be produced, to just mention here the most important parameters. Skilled artisans in the field of the production of composite materials know a large number of influential parameters to be considered and followed in order to achieve the intended results.

The following examples shall only act as exemplary and more detailed description of the disclosure without restriction on scope of the disclosure.

Example 1

The following example describes the formation of an adhesive resin based on urea, 5-HMF, and glyoxal. The raw materials and the used amounts in the recipe are summarized in the following Table 1.

TABLE 1

Raw materials and their used amounts in the recipe concerning Example 1

| Reagents | Molar mass (Da) *) | Mol equiva-lents | Mass of raw materials used (g) |
|---|---|---|---|
| urea | 60 | 3.0 | 180 |
| 5-HMF (50 mass %) | 126 | 1.0 | 252 |
| Glyoxal (40 mass %) | 58 | 0.45 | 65 |

*) rounded to full digit numbers

Contrary to the 5-HMF-modified melamine-glyoxal resin mentioned above, here the urea-5-HMF-resin was modified by glyoxal, whereby the proportion of glyoxal on the total amount of used aldehydes in Example 1 is only 17 mass %. The amount of glyoxal was adjusted, after finding that the addition of a second aldehyde can solve the problems with inhomogeneities as encountered above, to the necessary number to keep these positive effects remaining.

For the preparation of the raw materials 548 g of a 23 mass % 5-HMF solution were concentrated in a rotary evaporator (rotavapor) under vacuum at p=<32 mbar and a temperature T of 42° C. until a solid content of 50 mass % was reached. With this step, the amount of 5-HMF solution was decreased from 548 g to 252 g. Same results can be achieved when directly using a 50% solution of 5-HMF. Another possibility is the use of mixtures of various types of 5-HMF with different concentrations or the mix of an 5-HMF solution of lower concentration with solid 5-HMF. Also the dissolution of the relevant mass of solid 5-HMF in water in order to get an aqueous 5-HMF solution with the desired concentration is a possible way for the preparation of the 5-HMF solution. The upconcentration of the 5-HMF solution starting with a lower concentration and yielding a higher concentrated 5-HMF solution after the upconcentration is no defined and necessary step in the procedure.

If such an upconcentration step is performed, no special procedure conditions for this step are requested and no special treatment of and changes in the chemical structure and behavior of the 5-HMF are requested when preparing aminoplastic resins based on this 5-HMF. The same is the case with any special composition of the upconcentrated 5-HMF concerning a certain proportion of oligomers. Oligomers have not been detected as well as they are neither intended nor necessary for the design of the resin preparation, as it is described here.

To those 252 g of the 50 mass % 5-HMF solution, 180 g of urea and 65 g of a 40 mass % glyoxal solution were added. The mixture was stirred at room temperature without heating until complete dissolution of the urea was achieved. Once the urea was dissolved, the pH of the mixture was measured and adjusted to pH=3 using an aqueous 10% solution of $H_2SO_4$. The necessary amount of the sulphuric acid is not specified and depends on the pH of the solution after the urea has dissolved. It is well-known to skilled artisans that urea can affect the pH in certain ways due to different proportions of residual ammonia in the urea. Tests with different types of urea did not show any special and unexpected effects.

The mixture after the urea was dissolved and after adjustment of the pH was then heated up to 40° C. and stirred at 500 rpm for 1 h, followed by cooling and additional 4 h of stirring at room temperature again at 500 rpm. After this period, the solution was liquid and can be stored as it is. Preferably, the pH is adjusted to pH=7.

In order to increase further the viscosity, depending on the intended application, the resin, as it was obtained after the two condensation steps at 40° C. and at room temperature, can be distilled in order to increase the resin solid content. For the determination of the resin solid content, a small amount of the resin (approx. 0.4-0.5 g) was treated at 50° C. and p<32 mbar for 10 minutes, followed by another 10 minutes at p<10 mbar, in order to remove all water. Once the solid content is determined, the necessary amount of water to be removed from the resin can be determined by calculation and the resin can be upconcentrated to the intended resin solid content. This resin solid content can be as an example 80 mass %, without restricting the intended resin solid content to other values, depending on the application mode.

To optimize the storage stability, it has found out by experiments that the longest possible storage stability was achieved at a starting pH after resin production of pH=9.5, under consideration of the decrease of the pH with time during storage, independent on the temperature during storage. Additionally it has proven to be an advantage, to stabilize the pH of the resin during the storage by adding small amounts (up to maximum 0.5 mass %) of sodiumbicarbonate to the final resin after its preparation.

Example 2

Example 2 is similar to Example 1, but with an increased amount of glyoxal. When changing the amount of glyoxal, no compensation was neither intended nor implemented to keep the equivalents of aldehyde groups to urea constant. In both examples, the total aldehyde equivalent increased by adding the equivalent for the glyoxal on top of the already given equivalent of the aldehyde group of the 5-HMF.

In Example 2, the amount of glyoxal was increased in comparison with Example 1, from an equivalent of 0.45 to 0.65. The raw materials and the used amounts in the recipe of Example 2 are summarized in the following Table 2. The proportion of glyoxal on the total amount of used aldehydes in Example 2 is 23 mass %.

TABLE 2

Raw materials and their used amounts in the recipe concerning Example 1

| Reagents | Molar mass (Da) *) | Mol equiva-lents | Mass of raw materials used (g) *) |
|---|---|---|---|
| urea | 60 | 3.0 | 180 |
| 5-HMF (50 mass %) | 126 | 1.0 | 252 |
| Glyoxal (40 mass %) | 58 | 0.65 | 94 |

*) rounded to full digit numbers

The preparation procedure for the resin in Example 2 is identical to the described procedure in Example 1.

Example 3

The curing reaction of the 5-HMF based resins as described in the two Examples 1 and 2, and the formation of durable bond lines using the two 5-HMF-based resins as examples for all mentioned types of 5-HMF resins, was investigated using the so-called Automatic Bonding Evaluation System (ABES; P. E. Humphrey, Device for testing adhesive bonds, U.S. Pat. No. 5,176,028; ASTM D7998-2015) method. The resins as described in Example 1 and Example 2 (6 droplets) were applied onto veneers and distributed properly over an area of 100 mm$^2$ (20 mm*5 mm). The ABES tests were performed at a press temperature of 120° C. for various press times of 30, 60, 120, and 300 seconds. According to the procedure of the ABES test, the overlap-ping part of the bonded sample was cooled with an air stream for 30 seconds, with subsequent determination of the bond strength by the tensile shear strength test mode. For each press time, the tests were repeated at least 3 times. Average tensile shear strength (MPa) and standard deviation for each of the hot-press times were determined and evaluated. FIG. 1 shows the development of the bond strengths with the press time for the two resins as described in Example 1 and Example 2. For the ABES tests, 5% of wheat flour was added to the two 5-HMF-based resins.

The occurrence of wood failure showed that curing of the resins was achieved. Wood failure means that the shear strength of the bond line is higher than the strength of the used wood veneers themselves. Skilled artisans will confirm that occurrence of wood failure is the strongest indication and evidence for a proper bonding result.

The invention claimed is:

1. A temperature-curable resin prepared by the (poly-) condensation of:

at least one aminoplast-forming chemical, at least one first (poly-)condensable chemical that is 5-hydroxymethylfurfural (5-HMF), its oligomers and/or its isomers, and at least one second (poly-)condensable chemical that is at least one aldehyde that is different from the first (poly-) condensable chemical, under reaction conditions under which said at least one aminoplast-forming chemical, at least one first (poly-) condensable chemical, and at least one second (poly-) condensable chemical (poly-)condense to the temperature curable resin, and wherein in the (poly-)condensation, a molar ratio (a:b:c) of (a) the totality of the at least one aminoplast-forming chemical, to (b) the totality of the at least one first (poly-)condensable chemical, to (c) the totality of the at least one second (poly-)condensable chemical is 1:0.1 to 1.0:0.05 to 0.5.

2. The temperature-curable resin according to claim 1, wherein the at least one second (poly-)condensable chemical is glyoxal.

3. The temperature-curable resin according to claim 1, wherein the at least one aminoplast-forming chemical is selected from the group of consisting of: urea, melamine, substituted melamine, substituted urea, acetylenediurea, guanidine, thiourea, thiourea derivatives, diaminoalkane, or diamidoalkane, or mixtures thereof.

4. The temperature-curable resin according to claim 1, comprising a viscosity of 150-1,000 mPa*s, all viscosities measured using a rotational viscosimeter at 20° C. according to ISO 3219:1994.

5. An aqueous composition of the temperature-curable resin of claim 1, wherein the solid content is 60-85 mass % as determined by evaporating a water content of the composition under vacuum until a constant mass has been achieved.

6. A method for the production of a temperature-curable resin, the method comprising (poly-)condensation of at least one aminoplast-forming chemical, at least one first (poly-) condensable chemical that is 5-hydroxymethylfurfural (5-HMF), its oligomers and/or its isomers, and at least one second (poly-)condensable chemical that is at least one aldehyde that is different from the first (poly-)condensable chemical, under reaction conditions under which said at least one aminoplast-forming chemical, at least one first (poly-)condensable chemical, and at least one second (poly-) condensable chemical (poly-)condense to the temperature curable resin, and wherein in the (poly-)condensation, a molar ratio (a:b:c) of (a) the totality of the at least one aminoplast-forming chemical, to (b) the totality of the at least one first (poly-)condensable chemical, to (c) the totality of the at least one second (poly-)condensable chemical is 1:0.1 to 1.0:0.05 to 0.5.

7. The method according to claim 6, wherein the (poly-) condensation is performed at temperatures in the range from 10 to 90° C.

8. The method according to claim 6, wherein the (poly-) condensation is carried out in a solution until the solution has reached a predetermined viscosity or the reaction is complete.

9. A method for the production of a composite material, comprising:

providing a temperature-curable resin according claim 1, bringing into contact the temperature-curable resin with a lignocellulose containing or non-lignocellulose containing material, or a mixture thereof, preparing a curable mass, and curing of the curable mass thereby forming the composite material, said curing being carried out by means of elevated temperature and pressure.

10. The method according to claim 9, wherein the lignocellulose-containing materials or the non-lignocellulose containing material is selected from the group consisting of: wood chips, wood fibers, plant fibers, wood flakes, wood strands, wood particles, wood stripes, inorganic fibres, inorganic fibre mats, and mixtures thereof.

11. The method according to claim 9, wherein the lignocellulose-containing or the non-lignocelluose containing material is mixed with an amount of 2% by weight to 20% by weight of the temperature-curable resin, based on the weight of the dry lignocellulose-containing or non-lignocellulose containing material.

12. The method according to claim 9, wherein the step of preparing the curable mass is carried out in a flat press, continuous press, or molding press.

13. The method according to claim 9, wherein the curing of the resin is carried out in a press at a temperature of 160 to 250° C.

14. A composite material formed by the method according to claim 9, wherein the composite material comprises a composite board based on wood or inorganic materials in a form of a wooden particleboard, fiberboard, OSB panel, HDF- or MDF panel, plywood and/or blockboard.

* * * * *